United States Patent [19]

Campbell et al.

[11] Patent Number: 4,522,533
[45] Date of Patent: Jun. 11, 1985

[54] FLOW RESTRICTOR

[75] Inventors: R. Clark Campbell, Orangeville; D. Ronald Townsend, Gloucester, both of Canada

[73] Assignees: The Corporation of the Town of Vaughan, Ontario; The University of Ottawa, Ottawa, both of Canada

[21] Appl. No.: 506,848

[22] Filed: Jun. 22, 1983

[30] Foreign Application Priority Data

Jun. 24, 1982 [CA] Canada .................................. 405883

[51] Int. Cl.³ ............................. E03F 3/04; E03F 5/00
[52] U.S. Cl. ........................................ 405/36; 138/44; 405/40
[58] Field of Search ............... 138/39, 44, 45; 405/40, 405/42, 88, 90, 91, 127, 36, 41; 4/626, 652, 653; 215/355

[56] References Cited

U.S. PATENT DOCUMENTS

| 162,403 | 4/1875 | McGuire | 405/127 X |
| 1,375,240 | 4/1921 | Sullivan | 405/90 |
| 1,772,518 | 8/1930 | Pardini | 405/90 |
| 1,862,238 | 6/1932 | Roe et al. | 138/44 X |
| 1,882,845 | 10/1932 | Horsman | 138/44 X |
| 3,750,710 | 8/1973 | Hayner | 138/44 X |
| 4,098,422 | 7/1978 | Slomski | 215/355 |
| 4,354,624 | 10/1982 | Chowdhury et al. | 138/45 X |

FOREIGN PATENT DOCUMENTS 429378 4/1948 Italy ......................................... 4/652

Primary Examiner—Stephen Marcus
Assistant Examiner—Mark Thronson
Attorney, Agent, or Firm—John A. Baker

[57] ABSTRACT

The present invention relates to a flow restrictor for insertion into the inlet of a pipe to restrict fluid flow within said pipe to a predetermined maximum. The flow restrictor is comprised of a tapered tubular hollow body portion having a smaller diameter and a larger diameter end. A cover plate is attached to the larger diameter end. An aperture having a predetermined cross-sectional area is located in the cover plate. The smaller diameter end is open to fluid flow. The predetermined cross-sectional area of the aperture determines the predetermined maximum fluid flow.

14 Claims, 5 Drawing Figures

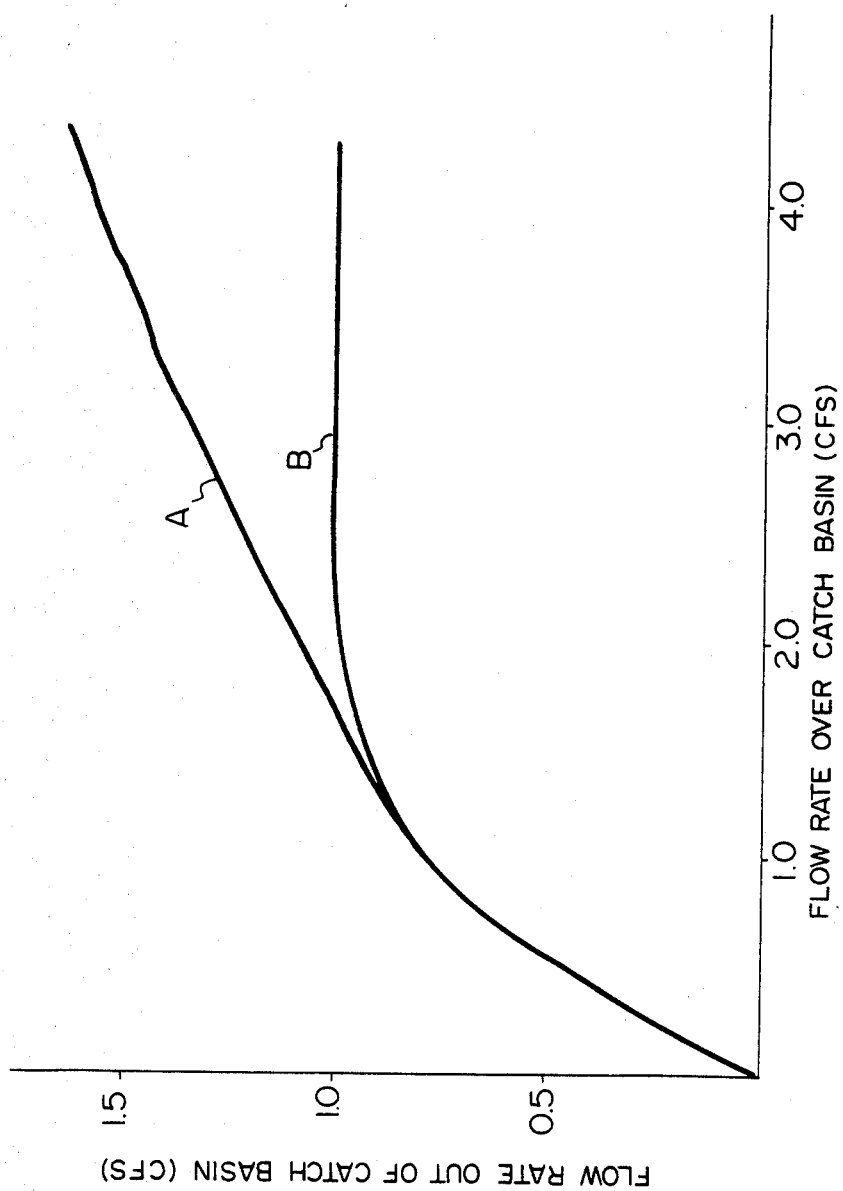

FLOW RESTRICTOR

The present invention relates to flow restrictors and in particular to flow restrictors which are used in storm sewer catch basins.

The normal diameters of sewer pipes which lead directly out of catch basins are 8, 10 and 12 inches, 20.3, 25.4 and 30.5 cms, respectively. Under normal run off conditions the flow rate of water entering the catch basin is lower than the flow rate of the outlet pipe. As a result, when a plurality of such outlet pipes feed a main storm sewer the sum of the flow rates entering the main sewer is less than the maximum flow rate of the main sewer. However, under abnormal runoff conditions, the flow rate entering the catch basin dramatically increases and as the head in the catch basin increases the flow rate in the outlet pipe of the catch basin increases until the maximum total flow rate entering the main sewer pipe is exceeded. Under these conditions the water pressure in the entire system increases and can cause storm sewer outlets in houses to back up causing flooding in basements. One attempted solution has been to insert a plug in the sewer outlet at the point where the outlet leaves a dwelling. Unfortunately, this has not been successful because the responsibility for inserting the plug rests with each homeowner and, of course, such insertion is not always done. A second problem sometimes occurs when the plugs are installed in that the hydrostatic pressure in the surrounding soil under the basement increases until the basement floor cracks and flooding occurs.

One solution of the above problem is to restrict the sum of the flow rates of all pipes feeding the main sewer so that this sum does not exceed the maximum flow rate of the sewer at a safe hydrostatic pressure. It is not a difficult chore to do this when constructing a new sewer system, however, the problem is not as easily solved in existing sewer systems.

The present invention solves the above stated problem in existing sewer systems in that it provides a flow restrictor for insertion into the inlet end of the outlet pipe of a catch basin so that the sum of the maximum flow rate of the various pipes feeding the main sewer pipe does not exceed the maximum flow rate of the main sewer pipe. This flow restrictor maintains a maximum flow rate through the pipe connected to the catch basin even when the catch basin has filled to its maximum and water is flowing down the road. In fact, such flow restrictors are designed to allow excess flow to travel through the road system. This is an undesirable effect but better than the flooding of basements of dwellings in the immediate vicinity of the sewer system.

The flow restrictor of the present invention is comprised of a unit which is inserted into the outlet pipe within the catch basin. It is made of an inexpensive plastic material and does not completely fit within the pipe so that it can be easily extracted if blocked in a flooded catch basin. By using the flow restrictor in accordance with the present invention in combination with an O-ring or a sleeve, one size of restrictor can be adapted to fit the larger 10 and 12 inch, 25.4 and 30.5 cm, respectively, diameter pipes.

In accordance with an aspect of the invention there is provided a flow restrictor for insertion into the inlet of a pipe to restrict fluid flow within said pipe to a predetermined maximum, said restrictor being comprised of a tapered tubular hollow body portion having a smaller diameter and a larger diameter end; a cover plate attached to said larger diameter end; an aperture having a predetermined cross-sectional area located in said cover plate, said smaller diameter end being open to fluid flow, wherein said predetermined cross-sectional area determines said predetermined maximum fluid flow. In use, the hollow body portion is frictionally held within the pipe.

The present invention will be described in detail hereinbelow with the aid of the accompanying drawings, in which:

FIG. 5 is a diagram showing the flow rate through the outlet pipe both with and without the restrictor of the present invention.

Figure 1:
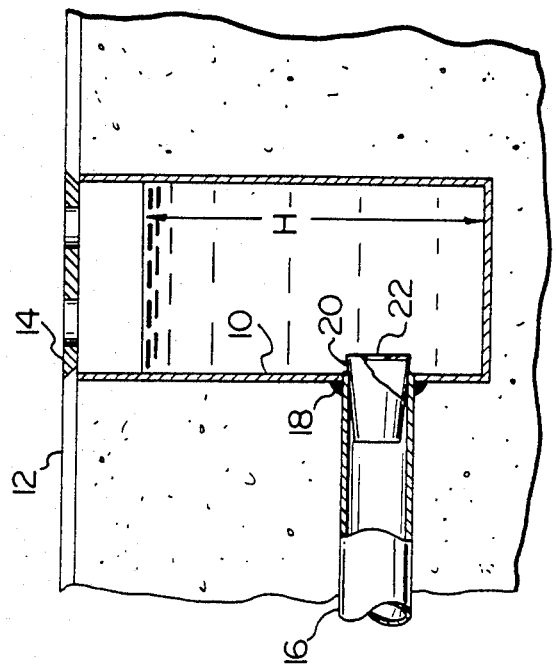
FIG. 1 is a schematic sectional diagram of a catch basin employing an embodiment of the present invention.

Referring now to FIG. 1 there is shown a catch basin 10 under a roadway 12 having a grate 14 located thereon. An outlet pipe 16 is inserted into an aperture in the catch basin and connected to the catch basin by grout 18. The pipe shown in FIG. 1 has a standard inside diameter of, for example, 8 inches, 20.3 cms. A flow restrictor 20 according to the present invention is inserted into the inlet end of the pipe 16 and includes an aperture 22.

When water fills the catch basin to a height H, shown in FIG. 1, the flow restrictor 20 restricts the flow of water through pipe 16 to a predetermined maximum amount. When the height H of water within the catch basin increases, the water flow through the flow restrictor and through pipe 16 will increase to a predetermined maximum value.

Figure 2:
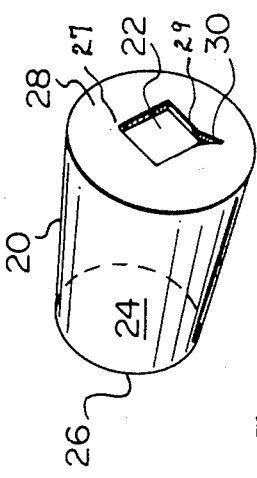
FIG. 2 is a perspective view of a particular embodiment of the present invention.

FIG. 2 is a detailed perspective view of a particular embodiment of the flow restrictor. The flow restrictor 20 is comprised of a tapered tubular body 24 being opened at its smaller end 26. Its larger end is covered by a front plate 28 having an aperture 22 located therein. The aperture can be of any cross-sectional shape. The cross-sectional area of the aperture is dimensioned to restrict the flow of water therethrough to a predetermined maximum which must be determined by the maximum head of the water within the catch basin. For example, for normal catch basins having an average vertical height of 4 feet 121.9 cms, an 11 square inch, 70.9 square cms aperture 22 provides a maximum restricted flow rate of 1.0 cubic foot per second (CFS), 28,317 cubic centimeters per second. The material of the preferred embodiment is polyethylene having a wall thickness of approximately 0.1 inch, 0.254 cms. The preferred restrictor was designed for insertion without sleeves into an 8 inch, 20.3 cms diameter pipe and has a large circular dimension of 8½ inches, 21.6 cms, a small circular dimension of 7 inches, 17.8 cms, and a length of 12 inches, 30.5 cms.

The degree of taper appears to be important and it was found that a taper of 0.125 inches per inch, 0.125 cms per centimeter is satisfactory. It has been found that such a taper provides a firm insertion of the flow restrictor into the inlet of the outlet pipe even when the outlet pipe connects with the catch basin at an oblique angle. It should be noted that the invention is not limited to this taper.

A preferred embodiment of the present invention employs a diamond-shaped configuration for the aperture 22 which provides a turbulent flow of water through the aperture. The diamond-shaped configuration is oriented so as to have an upper vertex 27 and a lower vertex 29. Such turbulent flow flushes away small twigs and debris from the aperture thereby reducing the possibility of clogging. An additional feature is shown by the small tapered aperture extension 30, shown in FIG. 2. This allows the water to recede into the sump of the catch basin so that floating debris is not directly in front of the main aperture 22 when a sudden flow of water takes place. As a result, turbulence can build up in the water flow prior to the floating material contacting the aperture 22 thereby further reducing the chances of clogging. Due to the small tapered aperture extension 30 ice build up will begin below the level of the main aperture 22. This aids in preventing a sudden supercharging of the catch basin in the event of a quick thaw which would result in a sudden influx of water into the catch basin. When the aperture extension 30 is employed, such extension extends from lower vertex 29 so that vertex 29 is physically eliminated and would only then represent an imaginary point at the meeting of two adjacent sides of main aperture 22.

Figure 3:
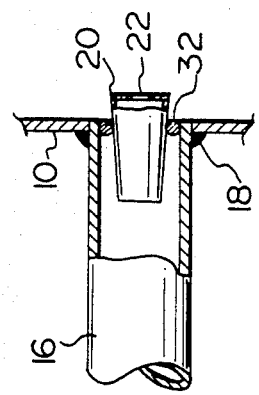
FIG. 3 is a schematic diagram of the present invention used in combination with an O-ring for insertion into an outlet pipe of a larger diameter.

The flow restrictor 20 can be used in conjunction with an O-ring 32 for insertion into an outlet pipe 16 having a diameter larger than the optimum designed diameter for the flow restrictor. The O-ring 32 is shown in FIG. 3 and is first placed over the tapered section 24 of the flow restrictor 20. The flow restrictor including the O-ring is then inserted into the oversized inlet of the outlet pipe 16. Such a configuration allows for the outlet pipe 16 meeting the catch basin at some oblique angle.

Figure 4:
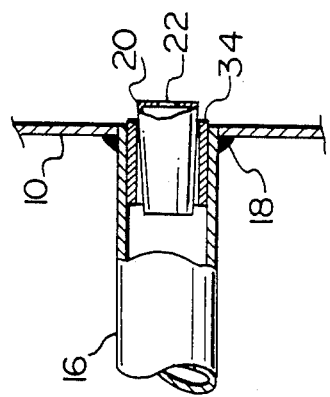
FIG. 4 is a schematic diagram of the present invention used in conjunction with a sleeve for insertion into an outlet pipe of a larger diameter.

FIG. 4 shows the use of a sleeve 34 which is first inserted into the pipe 16 to reduce the diameter of its inlet to a size which is adaptable for use with the flow restrictor 20.

Finally, FIG. 5 is a graph showing the flow rate over grate 14 at the top of the catch basin versus the flow rate into the pipe 16. Curve A represents an unrestricted inlet at pipe 16 and curve B represents the flow rate into pipe 16 using a flow restrictor according to the present invention. It can be seen that using the flow restrictor according to the present invention, a maximum outlet flow rate is obtained. In the example shown in FIG. 5 such a maximum is 1.0 CFS, 28,317 cubic centimeters per second.

We claim:

1. A flow restrictor for insertion in the inlet of a substantially horizontally oriented outlet pipe of a catch basin to restrict fluid flow within said pipe to a predetermined maximum, said restrictor being comprised of:
   a tapered tubular hollow body portion having a smaller diameter end and a larger diameter end;
   a cover plate attached to said larger diameter end;
   an aperture having a predetermined cross-sectional area located in said cover plate, said smaller diameter end being open to fluid flow, wherein said predetermined cross-sectional area determines said predetermined maximum fluid flow;
   a sleeve member, said tapered tubular hollow body being wedged within said sleeve member, said sleeve member being adapted for insertion into the inlet of said outlet pipe;
   wherein said tapered tubular hollow body can be frictionally held within said outlet pipe so that said flow restrictor partly extends from the inlet of said outlet pipe into said catch basin for easy extraction of the flow restrictor from said outlet pipe.

2. A flow restrictor for insertion in the inlet of a substantially horizontally oriented outlet pipe of a catch basin to restrict fluid flow within said pipe to a predetermined maximum, said restrictor being comprised of:
   a tapered tubular hollow body portion having a smaller diameter end and a larger diameter end;
   a cover plate attached to said larger diameter end;
   an aperture having a predetermined cross-sectional area located in said cover plate, said smaller diameter end being open to fluid flow, wherein said predetermined cross-sectional area determines said predetermined maximum fluid flow and wherein the cross-sectional area of said aperture is about 11 square inches, 70.9 square centimeters, thereby providing a maximum aperture flow rate of about 1.0 cubic feet per second, 28,317 cubic centimeters per second, for a fluid head of approximately 4 feet, 121.9 cms in said catch basin;
   wherein said tapered tubular hollow body can be frictionally held within said outlet pipe so that said flow restrictor partly extends from the inlet of said outlet pipe into said catch basin for easy extraction of the flow restrictor from said outlet pipe.

3. A flow restrictor for insertion in the inlet of a substantially horizontally oriented outlet pipe of a catch basin to restrict fluid flow within said pipe to a predetermined maximum, said restrictor being comprised of:
   a tapered tubular hollow body portion having a smaller diameter end and a larger diameter end;
   a cover plate attached to said larger diameter end;
   an aperture having a predetermined cross-sectional area located in said cover plate, said smaller diameter end being open to fluid flow, wherein said predetermined cross-sectional area determines said predetermined maximum fluid flow, wherein said aperture is in the form of a 4 sided, diamond-shaped polygon having an upper vertex and a lower vertex, and wherein said aperture is additionally comprised of a narrow downwardly extending opening at said lower vertex;
   wherein said tapered tubular hollow body can be frictionally held within said outlet pipe so that said flow restrictor partly extends from the inlet of said outlet pipe into said catch basin for easy extraction of the flow restrictor from said outlet pipe.

4. The flow restrictor of claim 1, 2, or 3 wherein said flow restrictor is comprised of polyethylene having a wall thickness of about 0.1 inches, 0.254 cms.

5. The flow restrictor of claim 1, 2, or 3 wherein said tapered tubular hollow body is tapered inwardly at a rate of about 0.125 inches per inch, 0.125 cms per cm of length.

6. The flow restrictor of claim 1 or 2 wherein n equals 4 and said aperture is diamond-shaped having an upper vertex and a lower vertex.

7. The flow restrictor of claim 1 or 2, wherein said aperture is in the form of an n sided polygon where n is an integer greater than 2.

8. A sewer system including a main sewer pipe, at least one catch basin and a secondary pipe, each secondary pipe having an inlet end connected to the catch basin and an oulet end connected to the main sewer pipe, the improvement comprising a flow restrictor for insertion into the inlet end of each secondary pipe to limit the flow of fluid from each catch basin to said main sewer pipe to a predetermined maximum, said flow restrictor comprising:

a tapered tubular hollow body portion having a small diameter end and a large diameter end;

a cover plate attached to said large diameter end; and an aperture having a predetermined cross-sectional area located in said cover plate;

wherein the cross-sectional area of said aperture determines the predetermined maximum fluid flow into said main sewer pipe, and wherein said tapered tubular hollow body portion is in frictional contact with said inlet end of said secondary pipe so that said large diameter end protrudes into said catch basin.

9. The sewer system of claim 8 wherein the aperture of the flow restrictor is in the form of an n sided polygon where n is an integer greater than 2.

10. The sewer system of claim 8 wherein the flow restrictor is comprised of polyethylene having a wall thickness of about 0.1 inches, 0.254 cm.

11. The sewer system of claim 8 wherein the aperture of the flow restrictor has a cross-sectional area of about 11 square inches, 70.9 square cms.; whereby said maximum predetermined flow rate is 1.0 cubic feet per second, 28,317 cubic cms. per second, for a fluid head in said at least one catch basin of approximately 4 feet, 121.9 cms.

12. The sewer system of claim 8 wherein the tapered tubular hollow body of the flow restrictor is tapered inwardly at a rate of about 0.125 inches per inch, 0.125 cms. per cm.

13. The sewer system of claim 9, wherein in the aperture of the flow restrictor, n equals 4 and the aperture is diamond-shaped having an upper vertex and a lower vertex.

14. The sewer system of claim 13 wherein the aperture of the flow restrictor is additionally comprised of a narrow downwardly extending opening at said lower vertex.

* * * * *